United States Patent [19]
Garcia

[11] Patent Number: 5,812,292
[45] Date of Patent: Sep. 22, 1998

[54] OPTICAL CORRELATOR USING OPTICAL DELAY LOOPS

[75] Inventor: Joseph P. Garcia, Greenbelt, Md.

[73] Assignee: The United States of America as represented by the Secretary of the Navy, Washington, D.C.

[21] Appl. No.: 562,920

[22] Filed: Nov. 27, 1995

[51] Int. Cl.$^6$ ................................ G03H 1/26; H04J 14/08
[52] U.S. Cl. ............................................. 359/140; 359/22
[58] Field of Search .................................... 359/140, 173, 359/153, 15, 22, 25; 382/100

[56] References Cited

U.S. PATENT DOCUMENTS

| | | | |
|---|---|---|---|
| 3,694,657 | 9/1972 | Brooks | 359/15 |
| 4,277,137 | 7/1981 | Upatnieks et al. | 359/560 |
| 5,138,489 | 8/1992 | Paek | 359/561 |
| 5,363,233 | 11/1994 | Perniele | 359/316 |

*Primary Examiner*—Rafael Bacares
*Attorney, Agent, or Firm*—James B. Bechtel, Esq.

[57] ABSTRACT

An optical correlator is disclosed that compares signals of interest with selected reference signals stored in holograms. The holograms are arranged so that the selected reference signals impinge onto the plane of the entrance of fiber optics arranged with an optical delay line and fiber optic amplifiers to form a delay line amplifier array. The optical delay line receives the signals of interest represented by light modulated pulses. The cooperative action from the light from the hologram and the light from the optical delay line produces signals that are proportional to the correspondence between the signals of interest and the stored reference signals.

10 Claims, 2 Drawing Sheets

5,812,292

OPTICAL CORRELATOR USING OPTICAL DELAY LOOPS

STATEMENT OF INTEREST

The invention described herein may be manufactured and used by or for the Government of the United States of America, for governmental purposes, without the payment of any royalty thereon or therefor.

CROSS REFERENCE TO RELATED U.S. PATENT APPLICATION

This application is related to U.S. patent application Ser. No. 08/562,919, having attorney docket number 75,283 of J. Garcia and L. Koenigsberg, and assigned to the same assignee as the present invention.

BACKGROUND OF THE INVENTION

The present invention relates to a correlator and, more particularly, to an optical correlator having optical delay loops and at least one hologram, wherein the optic delay loops receive input signals of interest which are compared against selectable reference signals stored in the at least one hologram. The comparison produces output signals that are proportional to the correspondence between the input signals of interest and the stored reference signals.

Optical correlators are found in optical communication systems for signal detection applications involving data that are conveyed by light carriers whose frequency or operating wavelength is increasing as the technology continues to advance. The optical correlators are frequently implemented using spatial light modulator (SLM) technology that involves spatial data serving as reference data and representative of two or three dimensional quantities commonly stored on holograms. Current optical correlators serve well their intended purpose, but are limited as far as their speed of response is concerned, especially their inability of handling very high frequency input signals of interest, along with their inability to rapidly change reference signals to which the input signals are compared. More particularly, current spatial light modulators permit about a few thousand changes of reference signals each second which is considered inadequate for many optical correlation purposes. It is desired that an optical correlator be provided that is capable of handling high frequency input signals of interest, while at the same time also rapidly changing stored reference signals so as to provide an optical correlator that may serve the needs of high speed electronic warfare systems. An optical correlator which is described in the cross-referenced U.S. patent application Ser. No. 08/562,919, utilizing electron trapping material provides these needs for the high speed optical communication system. However, it is desired that an optical correlator be provided without the need of electron trapping material, yet still serve the needs of high speed signal detection and classification systems.

SUMMARY OF THE INVENTION

The present invention is directed to an optical correlator utilizing optical delay lines and providing a speed of response that serves the needs of high speed optical communication systems.

The optical correlator comprises a delay line loop, at least one hologram, means for generating a light excitation signal, a first plurality of optical fibers, a plurality of optical couplers, a second plurality of optical fibers, means arranged to receive and focus light rays into one beam, and means responsive to the focused beam. The delay line loop receives signals of interest comprised of light modulator pulses spaced from each other by a predetermined interpulse time. The delay line loop has a plurality of stations separated from each other along the delay line loop by a predetermined length so that pulses appearing between adjacent stations are spaced apart from each other by the predetermined interpulse time. The at least one hologram provides predetermined optical reference output signals when intercepted by light having a predetermined intensity. The generated light excitation signal is steerable to the at least one hologram and has an intensity which is controllable to provide each of the predetermined optical reference output signals. The first plurality of optical fibers each has entrance and exit portions, with the entrance portions being arranged to respectively intercept the optical reference output signals. The plurality of optical couplers respectively couple the pulses at the plurality of stations to the rear portion of the first plurality of optical fibers carrying the optical reference output signals. The plurality of optical couplers have an output carrying both the pulses and the optical reference output signals. The second plurality of optical fibers each has entrance and exit portions, with the entrance portion being arranged to respectively receive and convey the output signals of the optical couplers. The means for focusing the light rays into one beam is arranged to receive the output signals present at the rear portions of the second plurality of optical fibers. The means responsive to the focused beam produces electrical signals which are proportional to the correspondence between the signals of interest and the optical reference output signals.

Accordingly, it is an object of the present invention to provide an optical correlator utilizing optical delay loops and at least one hologram in such a manner to improve the overall speed of response of an optical correlator.

It is a further object of the present invention to provide fiber optic cables that serve as optical delay lines.

Still further, it is an object of the present invention to provide fiber optic amplifiers that cooperate with the fiber optic delay loops so that the overall sensitivity of the optical correlator is improved.

Other objects, advantages and novel features of the invention will become apparent in the following detailed description when considered in conjunction with the accompanying drawings therein.

DETAILED DESCRIPTION OF THE PREFERRED EMBODIMENTS

Figure 1:
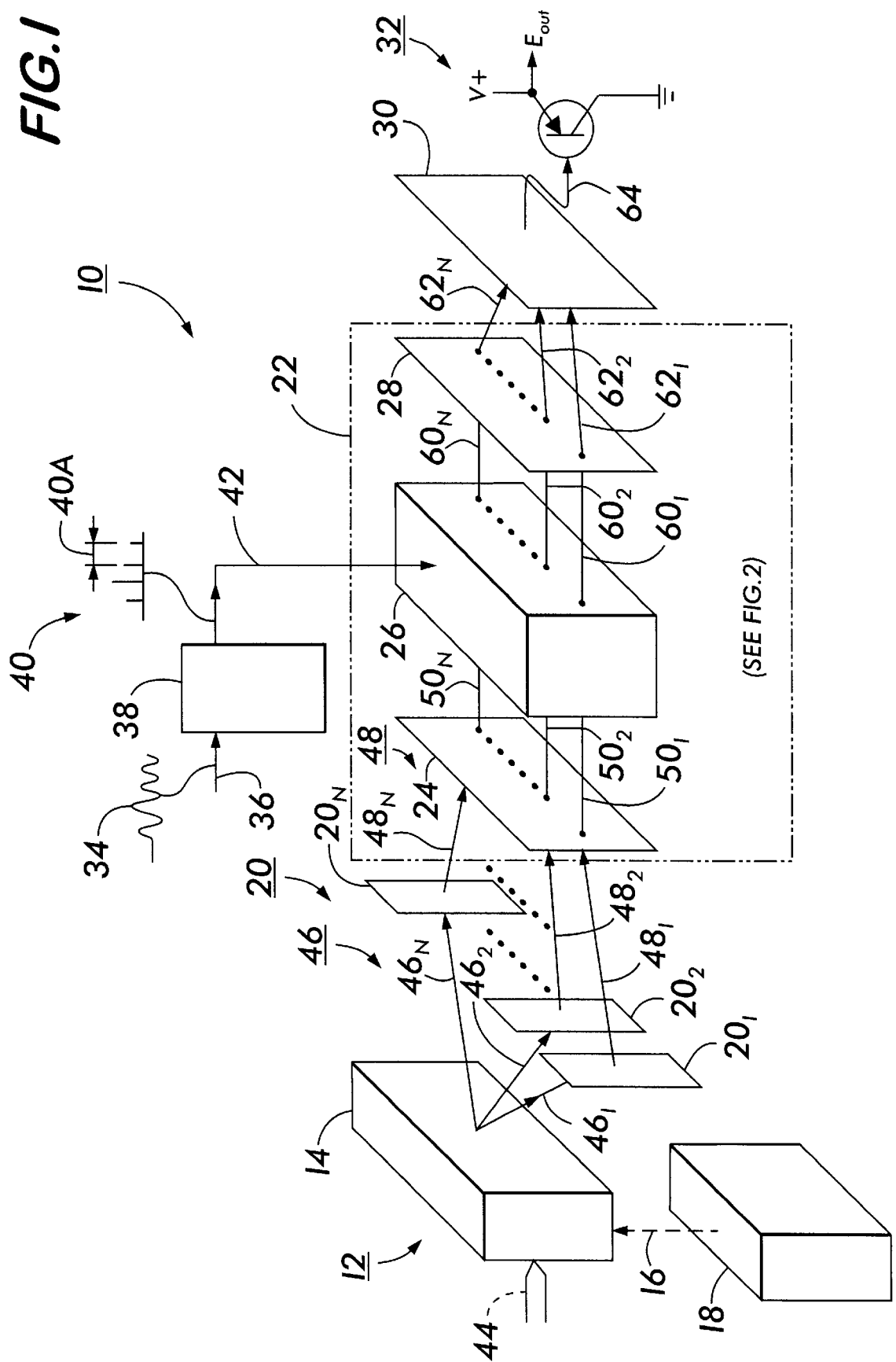
FIG. 1 is a block diagram of the optical correlator of the present invention.

With reference to the drawings, wherein the same reference numbers indicate the same elements throughout, FIG. 1 illustrates a block diagram of the optical correlator 10 of the present invention. The optical correlator 10 comprises an optical reference signal source 12 including beam steerer 14 that is responsive to an electrical signal applied on control line 16 by a control unit 18. The optical correlator 10 further comprises at least one hologram 20, but preferably a plurality of holograms $20_1$, $20_2$ . . . $20_N$, and a delay line amplifier array 22 comprising elements 24, 26 and 28 each to be further described with reference to FIG. 2. The optical correlator 10 further comprises means 30 for focusing light beams into one beam and photovoltaic device 32 that produces electrical output signals $E_{out}$.

In general, the optical correlator 10 compares input signals of interest 34 against selectable reference signals stored in the holograms $20_1 \ldots 20_N$. The optical correlator 10 produces output signals that are proportional to the correspondence between the input signals of interest 34 and the selectable reference signals stored in the hologram. The input signals of interest 34 are RF signals that are applied, via signal path 36, to a signal sampler 38 which may comprise a laser diode commonly found in fiber-optic communication networks. As in known in the art, the signals of interest 34 modulates the laser diode so that the RF signal 34 is effectively sampled at discrete times and appears as an intensity pulse train optical signal 40 in which the pulses are separated from each other, with respect to time, by a predetermined distance, sometimes referred to herein as interpulse time and is shown in FIG. 1 by reference number 40A. The signals of interest 34, in a high frequency domain, are converted into the pulse train 40 comprising light pulses by the signal sampler 38 that represents the signals of interest according to the intensity of the pulse train 40 as varied over time. The pulse train 40 has a typical operating wavelength of 1300 nanometers (nm) and which corresponds to the interpulse time 40A. The pulse train optical signal 40, via signal path 42, is applied to the delay line amplifier array 22.

A laser beam 44 having a typical operating wavelength of 488 nanometers (nm) is applied to the beam steerer 14. The beam steerer 14 may be an acousto-optic Bragg cell or surface acoustic wave (SAW) device each responsive, in a manner known in the art, to an electrical control signal applied on control line 16 by the control unit 18. The Bragg cell and the surface acoustic wave device are both known in the art and need not be further described herein but, if desired, reference may be made to U.S. Pat. No. 5,173,790, herein incorporated by reference, for a more detailed discussion of the use of a Bragg cell. Still further, the hologram 20 is known in the art and a detailed description of the structure and operation is not necessary to the understanding of this invention; however, if desired, reference may be made to U.S. Pat. No. 5,172,251, herein incorporated by reference, for a more detailed discussion of the general principles of a hologram device.

The beam steerer 14 serves as a means for selecting reference signals through light rays $46_1, 46_2, \ldots 46_N$ and comprising optical path 46 hereinafter referred to as beam 46. The light rays $46_1, 46_2, \ldots 46_N$ are shown as respectively intercepting holograms $20_1, 20_2, \ldots 20_N$. If desired, the plurality of holograms $20_1, 20_2, \ldots 20_N$, may be arranged into one hologram 20 having superpositioned holographic images that may be intercepted by a single beam 46 having light rays $46_1 \ldots 46_N$ that respectively intercept the stored contents of hologram 20 that is equivalent to holograms $20_1 \ldots 20_N$. In either case, the light rays $46_1, 46_2, \ldots 46_N$ are focused on particular locations of the respective hologram $20_1, 20_2, \ldots 20_N$ so as to provide predetermined reference optical output signals respectively illustrated as $48_1, 48_2, \ldots 48_N$. The intensity of each of the light rays $46_1, 46_2, \ldots 46_N$ is selected as a predetermined quantity so that the corresponding optical reference signals $48_1, 48_2, \ldots 48_N$ each represent a predetermined optical reference signal manifesting a two or three dimensional quantity. In the operation of the present invention, the intensity in each of the light rays $46_1, 46_2, \ldots 46_N$ is controlled and varied so that the accumulative intensity of the optical reference signals $48_1, 48_2, \ldots 48_N$ provides for a beam 48 which serves as a pump beam having each of its optical reference signals $48_1, 48_2$ . . . $48_N$ respectively impinging on the plane of the entrance portion of a first plurality of fiber optic cables $50_1, 50_2, \ldots 50_N$ that form part of the delay line amplifier array 22, which may be further described with reference to FIG. 2.

The first plurality of optical fibers $50_1 \ldots 50_N$ is appropriately positioned on a panel 24, in a manner known in the art, so that the plane of their entrance or face portions respectively intercept optical reference signals $48_1 \ldots 48_N$. The exit portion of each of the first plurality of optical fibers $50_1 \ldots 50_N$ is respectively connected to the inputs of a plurality of optical couplers $52_1, 52_2, \ldots 52_N$ known in the art. The optical couplers $52_1, 52_2, \ldots 52_N$ respectively couple some of the light being conveyed by optical loops $54_1, 54_2, 54_N$, as well as some of the light being conveyed by optical fibers $50_1, 50_2, \ldots 50_N$, into a second plurality of optical fibers $56_1, 56_2, \ldots 56_N$.

The optical loops $54_1, 54_2, \ldots 54_N$ are comprised of the optical cable 42 carrying the pulse train signal 40. Each of the loops $54_1, 54_2, \ldots 54_N$ serves as a delay line. More particularly, when light, such as one of the light pulses comprising signal 40, is introduced into the entrance portion of any of the loops, such as $54_1$, the conveyed light is delayed by a predetermined time, preferably corresponding to the interpulse time 40A separating the pulses of signal 40, before the conveyed light arrives at the exit portion of the same loop $54_1$. This delay (40A) is primarily determined by the length of the loop, such as loop $54_1$. The usage of the length of an optical cable to establish a predetermined time delay is known in the art but, if desired, reference may be made to U.S. Pat. Nos. 3,596,104 and 4,164,373, both herein incorporated by reference, for further details of the use of light carrying devices, such as optical cables, to provide delay time for the conveyance of light signals.

The optical delay line loops $54_1, 54_2, \ldots 54_N$ receive the signals of interest 40 comprised of the light modulated pulses spaced apart from each other by a predetermined interpulse time 40A. The optical delay line loops $54_1, 54_2, \ldots 54_N$ provide a plurality of stations correspondingly located at the central region of the loops $54_1, 54_2, \ldots 54_N$. The distance separating adjacent stations, corresponding to the length of the related loops $54_1 \ldots 54_N$, provides the delay time 40A so that the light pulses at adjacent stations are separated from each other by the interpulse time 40A corresponding to a typical operating wavelength of 1300 nm. The time separated pulses at the stations associated with loops $54_1 \ldots 54_N$ are respectively launched into optical couplers $52_1 \ldots 52_N$.

The optical couplers $52_1, 52_2, \ldots 52_N$ provide output signals which are respectively applied to the input or entrance portions of a second plurality of optical fibers $56_1, 56_2, \ldots 56_N$. The output signals of the optical couplers $52_1, 52_2 \ldots 52_N$ are representative of the product of the pulse train signal 40 at the respective stations $54_1, 54_2, \ldots 54_N$ and the reference optical output signals $48_1, 48_2, \ldots 48_N$ respectively present at the exit portion of the first plurality of optical fibers $50_1, 50_2, \ldots 50_N$. The optical couplers $52_1 \ldots 52_N$ operate in a known manner to provide for the representative product signal.

The exit portions of the second plurality of optical fibers $56_1, 56_2, \ldots 56_N$ are respectively routed to fiber optic amplifiers $58_1, 58_2, \ldots 58_N$. The fiber optic amplifiers $58_1, 58_2, \ldots 58_N$ preferably comprise a rare earth composition known in the art and need not be further described but, if desired, reference may be made to U.S. Pat. No. 5,056,096 issued Oct. 8, 1991, herein incorporated by reference, for further description of a fiber optic amplifier comprising a rare earth dopant. The outputs of the fiber optic amplifiers $58_1, 58_2, \ldots 58_N$ are respectively routed to a third plurality of optical fibers $60_1, 60_2, \ldots 60_N$.

Figure 2:
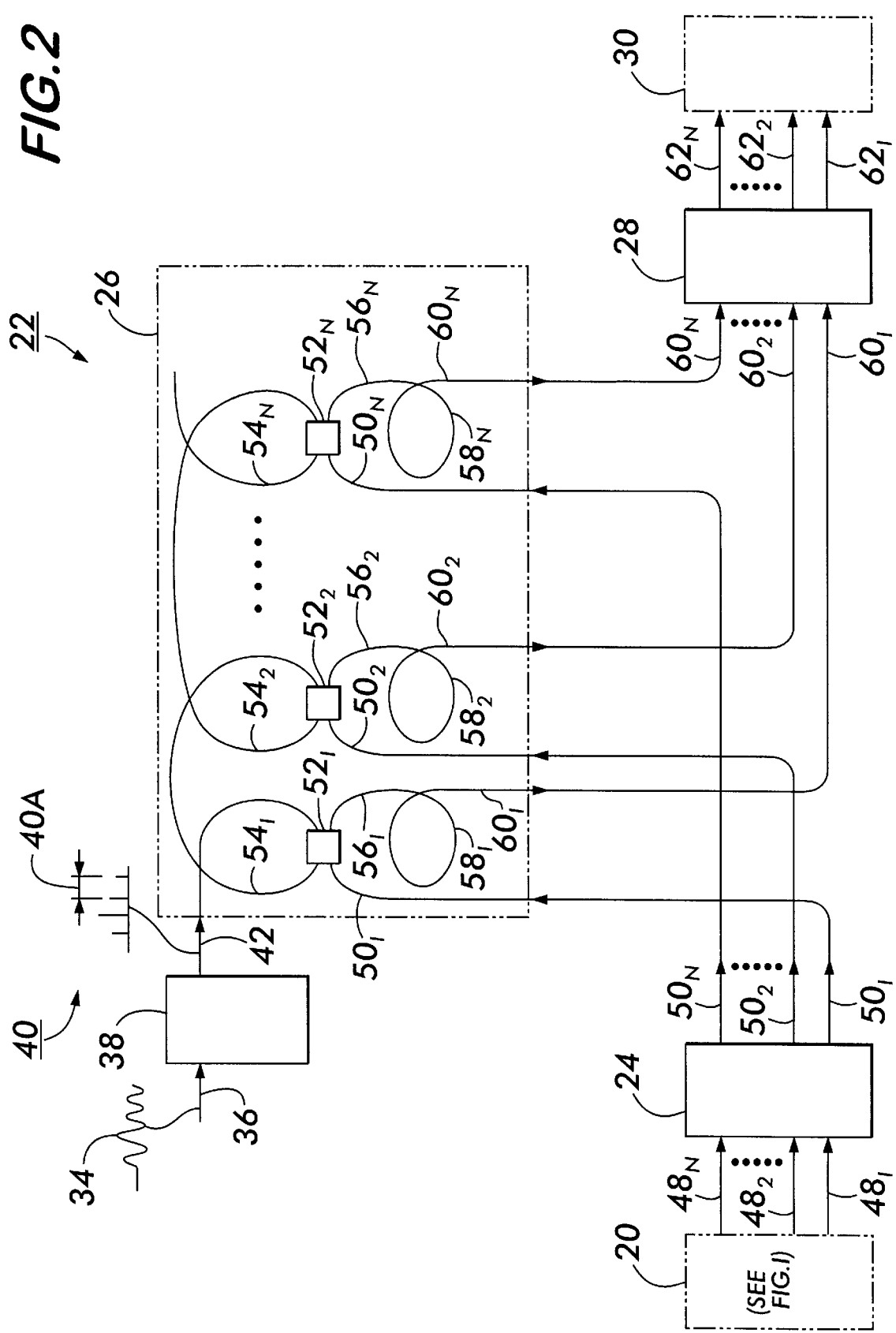
FIG. 2 is a schematic illustrating further details of the optic delay loop and amplifier array generally indicated in FIG. 1.

As generally illustrated in FIG. 2, and as more particularly depicted in FIG. 1, the optical fibers $60_1, 60_2, \ldots 60_N$ have their exit portion arranged on a platform 28 so that light rays $62_1, 62_2, \ldots 62_N$, respectively representative of the optical outputs of optical fiber amplifiers $58_1, 58_2, \ldots 58_N$, are launched out of the fibers $60_1, 60_2, \ldots 60_N$ and impinge upon a lens 30 which focuses the light rays $62_1, 62_2 \ldots 62_N$ into a single beam 64 which, in turn, is focused onto a photovoltaic device 32. As to be further described, the photovoltaic device 32 produces electrical output signals $E_{out}$ proportional to the correspondence between the signals of interest, represented by the light pulse train 40, and the reference optical reference signals represented by the optical reference signals $48_1, 48_2, \ldots 48_N$.

In operation, and with reference to FIG. 2, the delay line amplifier array 26 receives the pulse train signal 40 which is conveyed by each of the loops $54_1, 54_2, \ldots 54_N$ so that the central region of each loop $54_1 \ldots 54_N$, each serving as a station, is appropriately provisioned, such as being exposed by having its protective covering removed, so that the light being conducted therein is directed into the associated optical couplers $52_1, 52_2, \ldots 52_N$. If desired, a fiber optic delay line having taps, as known in the art, may be selected with the taps serving as the stations. The optical couplers $52_1, 52_2 \ldots 52_N$ couple some of the light from each loop $54_1, 54_2, \ldots 54_N$ respectively into the optical fiber $56_1, 56_2, \ldots 56_N$ which are preferably routed to fiber optic amplifiers $58_1, 58_2 \ldots 58_N$. The outputs of the fiber optic amplifiers $58_1, 58_2 \ldots 58_N$ are respectively represented by the light rays $62_1, 62_2, \ldots 62_N$ that impinge the lens 30.

In general, the intensity of light contained within each of the light rays $62_1, 62_2, \ldots 62_N$ is respectively controlled by varying the intensity of the individual light rays $46_1, 46_2 \ldots 46_N$ comprising the beam 46. The beam 46 in turn determines the intensity of pump beam 48 comprising optical reference signals $48_1, 48_2 \ldots 48_N$ respectively applied to the first plurality of optical fibers $50_1, 50_2, \ldots 50_N$. For a specific input signal intensity, such as that represented in the optical reference signal $48_1$, the output of a given fiber optic amplifier, such as $58_1$, will be directly proportional to the intensity of the optical reference signal $48_1$. More particularly, as previously described, the optical coupler, such as $52_1$ generates a product signal made up of the pulse modulated signal 40 and the signal being conducted by optical fiber $50_1$, which is optical reference signal $48_1$. This product signal of optical coupler $52_1$ is applied to optical fiber $56_1$ and eventually appears as light ray $62_1$. As the intensity of the optical reference signal $48_1$ is increased, it correspondingly increases the intensity of light ray $62_1$. The respective optical coupler and fiber optic amplifier, such as $52_1$ and $58_1$, cooperate to provide for an analog multiplication of pump beam 48 as represented by both the stored reference signals on the hologram 20 and the light pulse train 40 representative of the signals of interest 34. The overall operation of the optical correlator may be further described with reference to FIG. 1.

In general, the optical correlator 10 provides for correlation operations by controlling the intensity of the pump beam 48, more particularly, the intensity of each of the optical signals $48_1, 48_2, \ldots 48_N$, each of which is respectively applied to the fiber optic amplifiers $58_1, 58_2, \ldots 58_N$ (see FIG. 2). To provide for such a control, the beam steerer 14 directs laser light, in particular, light rays $46_1, 46_2, \ldots 46_N$ simultaneously and respectively to holograms $20_1, 20_2, \ldots 20_N$. The beam steerer 14 provides for accurate control of each of the laser light rays $46_1, 46_2, \ldots 46_N$. Each of the holograms $20_1, 20_2, \ldots 20_N$ then respectively directs light to the optical fibers $50_1, 50_2, \ldots 50_N$. The intensity of each of the optical reference signals $48_1, 48_2, \ldots 48_N$ respectively corresponds to some pattern stored in the holograms $20_1, 20_2, \ldots 20_N$. Each of the holograms $20_1, 20_2, \ldots 20_N$ stores patterns corresponding to the principle components of a family of correlation functions that can be spanned by having the beam steerer 14 vary the intensity of each of the light rays $46_1, 46_2, \ldots 46_N$, to the holograms $20_1, 20_2, \ldots 20_N$. When the signals of interest, represented by the pulse train 40, correspond to the patterns represented by optical reference signals $46_1, 46_2, \ldots 46_N$, a corresponding signal is contained in the light ray 64 which is of sufficient intensity to impinge upon the detector 32 such that by sampling the output voltage $E_{out}$, as known in the art, a correlation is registered.

The optical correlator 10 responds to a pulse train 40 having an operating wavelength corresponding to near infrared or visible light and representative of the high frequency signals of interest 34 and the beam steerer 14 conveys laser light having an operating wavelength suitable for optical pumping in the fiber optic amplifiers 58. Accordingly, the optical correlator 10 has the capability of changing the reference signals at this relatively high operating frequency limited only by the beam steerer 14, while at the same time has the capability of servicing the relatively high frequency RF signals represented by a pulse train 40.

It should now be appreciated that the practice of the present invention provides for an optical correlator 10 that has a relatively fast response time and measures the correlation between the signals of interest and the stored reference signals comprising spatial holographic data but representing temporal signals that provide signals proportional to the correspondence therebetween so as to provide for a correlation measurement thereof.

Many modifications or variations of the present invention are possible in view of the above disclosure. It is, therefore, to be understood, that within the scope of the appended claims, the invention may be practiced otherwise as specifically described.

What is claimed is:

1. An optical correlator comprising:
   (a) a delay line loop for receiving signals of interest comprised of light modulated pulses spaced apart from each other by a predetermined interpulse time, said delay line loop having a plurality of stations separated from each other along said delay line loop by a predetermined length so that pulses appearing between adjacent stations are spaced apart from each other by said predetermined interpulse time;
   (b) at least one hologram providing predetermined optical reference output signals when intercepted by a light excitation signal having a corresponding intensity;
   (c) means for generating a light excitation signal steerable to said at least one hologram and having an intensity controllable to provide each of said predetermined optical reference output signals;
   (d) a first plurality of optical fibers each having entrance and exit portions with the entrance portions arranged to respectively intercept said optical reference output signals;

(e) a plurality of optical couplers for respectively coupling said pulses at said plurality of stations to said exit portions of said first plurality of optical fibers carrying said optical reference output signals, said plurality of optical -couplers having an output carrying both said pulses and said optical reference output signals;

(f) a second plurality of optical fibers each having entrance and exit portions with the entrance portions arranged to respectively receive and convey said output signals of said plurality of optical couplers;

(g) means arranged to receive and focus into one beam said output signals present at said exit portions of said second plurality of optical fibers; and (h) means responsive to said focused beam to produce an electrical signals which are proportional to the correspondence between said signals of interest and said optical reference signals.

2. The optical correlator according to claim 1 further comprising a plurality of fiber optic amplifiers respectively interposed between said second plurality of optical fibers and said means arranged to receive and focus into one beam said output signals of said second plurality of optical fibers.

3. The optical correlator according to claim 1, wherein said outputs of said optical couplers are representative of the product of said pulses and said reference optical output signals.

4. The optical correlator according to claim 1, wherein said means for generating a light excitation signal steerable to at least one hologram is selected from one of a Bragg cell unit and surface acoustic wave device each responsive to an electrical control signal.

5. The optical correlator according to claim 1, wherein said delay line loop comprises a fiber optic delay line having taps thereon which comprise said plurality of stations.

6. The optical correlator according to claim 5, wherein said fiber optical delay line comprises a plurality of loops wherein the length of each loop equals a distance that produces a time delay corresponding to said interpulse time of said light modulated pulses, and a central region of each of said loops corresponding to a respective station.

7. The optical correlator according to claim 1, wherein said light modulated pulses are generated by a laser responsive to an alternating current signal having a wavelength corresponding to said interpulse time.

8. The optical correlator according to claim 1, wherein said at least one hologram stores a family of patterns to which the correlation of said signals of interests is measured.

9. The optical correlator according to claim 2, wherein said fiber optic amplifiers each comprises a dopant of a rare earth composition.

10. The optical correlator according to claim 1, wherein said optical reference output signals of said holograms serve as laser pumping signals that coact with the light modulated pulses to provide a signal at each of said output of said optical couplers.

\* \* \* \* \*